US010626259B2

United States Patent
Cheng et al.

(10) Patent No.: US 10,626,259 B2
(45) Date of Patent: Apr. 21, 2020

(54) POLYOLEFIN ELASTOMER COMPOSITE AND FOAMED ELASTOMER

(71) Applicant: SUNKO INK CO., LTD., Taichung (TW)

(72) Inventors: Wen-Wei Cheng, Taichung (TW); Chiu-Peng Tsou, Taichung (TW); Ting-Ti Huang, Taichung (TW)

(73) Assignee: SUNKO INK CO., LTD., Taichung (TW)

( * ) Notice: Subject to any disclaimer, the term of this patent is extended or adjusted under 35 U.S.C. 154(b) by 68 days.

(21) Appl. No.: 16/028,088

(22) Filed: Jul. 5, 2018

(65) Prior Publication Data

US 2020/0010656 A1    Jan. 9, 2020

(51) Int. Cl.
| | |
|---|---|
| *C08L 9/00* | (2006.01) |
| *C08L 23/08* | (2006.01) |
| *C08K 5/14* | (2006.01) |
| *C08L 27/18* | (2006.01) |
| *C08K 5/098* | (2006.01) |

(52) U.S. Cl.
CPC .......... *C08L 23/0853* (2013.01); *C08K 5/098* (2013.01); *C08K 5/14* (2013.01); *C08L 9/00* (2013.01); *C08L 23/0815* (2013.01); *C08L 27/18* (2013.01); *C08L 2203/14* (2013.01)

(58) Field of Classification Search
CPC .... C08L 23/0853; C08L 9/00; C08L 23/0815; C08L 2203/14; C08K 5/0098; C08K 5/14
See application file for complete search history.

(56) References Cited

U.S. PATENT DOCUMENTS

| | | | |
|---|---|---|---|
| 6,720,364 B2 | 4/2004 | Sueda | |
| 7,189,764 B2 | 3/2007 | Sueda | |
| 9,493,623 B2 | 11/2016 | Shimizu | |
| 2006/0229412 A1* | 10/2006 | Laksin et al. | ........... C08L 75/16 525/178 |
| 2006/0254734 A1* | 11/2006 | Hannay et al. | .......... C08K 5/09 162/134 |
| 2014/0073462 A1* | 3/2014 | Morgan | ............... A63B 43/008 473/378 |

FOREIGN PATENT DOCUMENTS

| | | |
|---|---|---|
| JP | 11-206406 A | 8/1999 |
| TW | 574296 B | 2/2004 |
| TW | I247777 B | 1/2006 |
| TW | I415882 B | 11/2013 |

* cited by examiner

*Primary Examiner* — Nathan M Nutter
(74) *Attorney, Agent, or Firm* — Sinorica, LLC

(57) ABSTRACT

A polyolefin elastomer composite includes a copolymer, an unsaturated aliphatic polyolefin, an organic peroxide, and an acrylic acid metallic salt mixture. The copolymer is an ethylene copolymer, an olefin block copolymer, or a combination thereof. The ratio of the amount of unsaturated aliphatic polyolefin and the copolymer is 1:3 to 3:1. Based on the total amount of the unsaturated aliphatic polyolefin and the copolymer as 100 parts by weight, the amount of the organic peroxide is 0.1 to 1 part by weight and the amount of the acrylic acid metallic salt mixture is 0.1 to 5 parts by weight. The polyolefin elastomer composite can produce a foamed elastomer having high rebound resilience and low compression set.

10 Claims, No Drawings

POLYOLEFIN ELASTOMER COMPOSITE AND FOAMED ELASTOMER

BACKGROUND OF THE INVENTION

1. Field of the Invention

The present invention relates to a cross-linked foaming polyolefin elastomer composite and a foamed elastomer, featured by soft touch of the product as well as low compression set and high rebound resilience of the foamed elastomer at a high expansion ratio.

2. Description of Related Art

With the trend toward lightweight products, much attention has been directed toward lightweight material and applications thereof. The lightweight material produced by foaming technique has the advantages of low density and good tenderness, and therefore can serve as the material of interior and exterior decorations, daily commodities, vehicle decoration, doors and windows, wrapping, or shoes.

However, the foaming process causes the breaking of the structural strength of the foamed material. Therefore, adding cross-linking agent into the foaming composite is well-known technology to maintain the structural strength of the foamed material. The cross-linking agent can enhance the cross-linked degree and the melt strength of the resin in the foaming composite, thus preventing the loss of structural strength.

In the existing foaming technique, ethylene/vinyl acetate copolymer is a common raw material to produce the foamed material. The foamed material produced by ethylene/vinyl acetate copolymer has advantages of lightweight, tenderness, low cost, and proper toughness, but other properties can hardly be taken into account. For example, after being compressed for a long term, the foamed material produced by ethylene/vinyl acetate copolymer may lose its rebound resilience and compression set.

As disclosed in Japan Patent No. 11-206406, a foamed material is produced by a foaming composite comprising an ethylene-vinyl acetate copolymer (EVA), an ethylene/butylene copolymer (EBM), an organic acid peroxide, sulphur, and a foaming agent. The density, rebound resilience, and compression set of the foamed material are slightly improved but are still not good enough.

As disclosed in U.S. Pat. No. 7,189,764 and Taiwan Patent No. 247777, a foaming composite comprises an ethylene/alpha-olefin copolymer, an organic acid peroxide, a curing coagent (preferably triallylisocyanurate (TAIC) or triallylcyanurate (TAC)), and a foaming agent. The foaming ratio, the compression set, and the tear strength of the foamed material produced can be improved by controlling the proportions of ethylene/alpha-olefin copolymers, but the properties are still not optimal.

As disclosed in U.S. Pat. No. 6,720,364 and Taiwan Patent No. 574296, an organic peroxide, a curing co-agent, an organic metallic salt (preferably zinc diacrylate or zinc dimethacrylate), and a foaming agent can be added in a foaming composite comprising ethylene/alpha-olefin copolymer, ethylene/vinyl acetate copolymer, and low density polyethylene synthesized by high pressure method. The foaming composite has to go through a second compression molding process to prevent surface foam-breaking and to balance the properties of weight, compression set, tear strength, and impact resistance.

As disclosed in U.S. Pat. No. 9,493,623 and Taiwan Patent No. 415882, a foaming composite comprises an ethylene copolymer and a polyolefin copolymer comprising an ethylene aromatic monomer and a conjugated diene monomer. To improve the weight, tenderness, compression set, and tear strength, the foaming composite has to go through a second compression molding process to form a foamed material which has good rebound resilience and structural stability and thus is suitable as a midsole material of shoes. However, the second compression molding process will decrease the tenderness of the foamed elastomer and increase the processing time, processing complexity, and production cost.

SUMMARY OF THE INVENTION

To overcome the shortcomings, an objective of the present invention is to provide a polyolefin elastomer composite and a foamed elastomer. The foamed elastomer produced from the polyolefin elastomer composite has excellent rebound resilience, low compression set, and proper structural strength.

The invention is to provide a polyolefin elastomer composite comprising a copolymer, an unsaturated aliphatic polyolefin, an organic peroxide, and an acrylic acid metallic salt mixture. The copolymer is an ethylene copolymer, a polyolefin block copolymer, or a combination thereof. The weight ratio of the unsaturated aliphatic polyolefin to the copolymer is from 1:3 to 3:1. Based on the total amount of the unsaturated aliphatic polyolefin and the copolymer as 100 parts per hundreds of resin (phr), the amount of the organic peroxide ranges from 0.1 phr to 1 phr and the amount of the acrylic acid metallic salt mixture ranges from 0.1 phr to 5 phr.

By means of the technical features above, the foamed elastomer produced from the polyolefin elastomer composite has sufficient structural strength, high rebound resilience, and low compression set. Due to the proper structural strength and properties, the process of preparing the foamed elastomer can omit the second compression molding process and therefore shorten the processing time, simplify the processing complexity, and reduce the production cost. Further, it avoids disadvantages of the second compression molding process.

Preferably, the ethylene copolymer is selected from the group consisting of an ethylene/vinyl acetate copolymer, an ethylene/octene copolymer, a polyethylene (PE), an ethylene/alpha-olefin copolymer, an ethylene/alpha-olefin non-conjugated diene copolymer, an ethylene/acrylic copolymer, an ethylene/methyl acrylic copolymer, an ethylene/methyl acrylate copolymer, an ethylene/methyl methacrylate copolymer, an ethylene/ethyl acrylate copolymer, an ethylene/ethyl methacrylate copolymer, an ethylene/butyl acrylate copolymer, an ethylene/butyl methacrylate copolymer, and any combination thereof.

More preferably, the copolymer is selected from the group consisting of an ethylene/vinyl acetate copolymer, an ethylene/octene copolymer, a polyolefin block copolymer, and any combination thereof.

More preferably, the copolymer includes at least two kinds of ethylene copolymers, at least two kinds of polyolefin block copolymers, or a kind of ethylene copolymer with a kind of polyolefin block copolymer. For example, the copolymer can be a combination of ethylene/vinyl acetate copolymer and ethylene/octene copolymer, a combination of ethylene/vinyl acetate copolymer and polyolefin block copolymer, or a combination of ethylene/octene copolymer and polyolefin block copolymer.

Much more preferably, when using two kinds of ethylene copolymers in combination, the foamed elastomer produced from the polyolefin elastomer composite has higher rebound resilience and lower compression set. Further, the density and the hardness of the foamed elastomer can be adjusted by using different kinds and proportions of ethylene copolymers. Similarly, when using one kind of ethylene copolymer with one kind of polyolefin block copolymer, the foamed elastomer can also have higher rebound resilience and lower compression. Therefore, the density and the hardness of the foamed elastomer can also be adjusted.

Preferably, the unsaturated aliphatic polyolefin is selected from the group consisting of an ethylene propylene diene monomer rubber (EPDM), a polybutadiene rubber (BR), a butyl rubber (IIR), a natural rubber (NR), an isoprene rubber (IR), and any combination thereof.

More preferably, the unsaturated aliphatic polyolefin is selected from the group consisting of an ethylene propylene diene monomer rubber, a polybutadiene rubber, and a combination thereof.

Preferably, the organic peroxide is selected from the group consisting of a dicumyl peroxide, a bis(tert-butylperoxyisopropyl)benzene, a tert-butyl peroxybenzoate, a di(methylbenzoyl)peroxide, and any combination thereof.

Preferably, by controlling the amount of the organic peroxide ranging from 0.1 phr to 1 phr, the foamed elastomer has an optimized density, hardness, and lower compression set. More preferably, the amount of the organic peroxide ranges from 0.2 phr to 0.5 phr.

Preferably, the polyolefin elastomer composite includes a foaming agent which can be an azo compound, a nitroso compound, or a sulfonyl hydrazine compound. The azo compound can be an azodicarbonamide, an azodicarboxylicamide, an azodiisobutyronitrile, a diisopropyl azodicarboxylate, a diethyl azodicarboxylate, an aminoazobenzene, or a barium azodicarboxylate. The nitroso compound can be a N,N'-dinitrosopentamethylene tetramine or a N,N'-dimethyl-N,N'-dinitroso terephthalamide. The sulfonyl hydrazine compound can be a 4,4'-bis(sulfonylhydrazine)diphenyl ether, a p-toluensulfonyl hydrazide, a diphenylsulfone-3,3'-disulfonyl hydrazide, a 4,4'-diphenyl disulfonamide, a 1,3-benzenedisulfonyl hydrazide, or a 1,4-benzenedisulfonyl hydrazide.

Preferably, the amount of the acrylic acid metallic salt mixture ranges from 0.1 phr to 5 phr. More preferably, the amount of the acrylic acid metallic salt mixture ranges from 1 phr to 2.5 phr.

Preferably, the acrylic acid metallic salt mixture includes a substituted or unsubstituted zinc acrylate compound. Specifically, the unsubstituted zinc acrylate compound is a zinc diacrylate. The substituted zinc acrylate compound can be a zinc dimethacrylate, a zinc diethylacrylate, a zinc dipropylacrylate, a zinc dibutylacrylate, a zinc dipentylacrylate, a zinc dihexylacrylate, or any combination thereof, but is not limited to the above.

Preferably, the acrylic acid metallic salt mixture includes a dispersant which can be a polytetrafluoroethylene (PTFE) wax or a PTFE-modified polyethylene wax. More preferably, the amount of the dispersant is from 0.1 weight percent (wt %) to 5 wt % based on the total amount of the acrylic acid metallic salt mixture. When the acrylic acid metallic salt mixture includes the dispersant, the polyolefin elastomer composite can be cross-linked homogeneously, thereby improving the compression set of the foamed elastomer.

Preferably, the polyolefin elastomer composite includes an additive to enhance the thermal stability and the cross-linked uniformity. The additive includes a fatty acid having 12 to 20 carbon atoms, a fatty acid metallic salt (such as zinc stearate, calcium stearate, and barium stearate), a polyethylene wax, a zinc oxide, an urea, a talcum powder, a calcium carbonate, a titanium dioxide, a kaolinite, or any combination thereof. More preferably, the additive may be a zinc stearate, a stearic acid, or a zinc oxide.

The invention provides a foamed elastomer produced from the polyolefin elastomer composite of the present invention.

By means of the technical features above, the foamed elastomer has a sufficient structural strength as well as high rebound resilience and low compression set. Therefore, the foamed elastomer can be broadly applied in many fields, such as sports, transportation, architectural materials, components of shoes, or daily commodities.

Specifically, the foamed elastomer is produced from the polyolefin elastomer composite by compression molding foaming, in-mold foaming, or injection molding foaming.

Preferably, the shore hardness of the foamed elastomer ranges from 15 C to 65 C, but is not limited to the above.

Preferably, the density of the foamed elastomer ranges from 0.1 $g/cm^3$ to 0.25 $g/cm^3$.

Preferably, the rebound resilience of the foamed elastomer ranges from 60% to 80%; more preferably, the rebound resilience of the foamed elastomer ranges from 65% to 80%.

Preferably, the compression set of the foamed elastomer ranges from 20% to 40%; more preferably, the compression set of the foamed elastomer ranges from 20% to 35%.

Preferably, the density of the foamed elastomer is lower than 0.2 $g/cm^3$ and the tear strength of the foamed elastomer ranges from 5 kg/cm to 15 kg/cm; more preferably, the density of the foamed elastomer is lower than 0.2 $g/cm^3$ and the tear strength of the foamed elastomer ranges from 8 kg/cm to 15 kg/cm.

More preferably, when the density of the foamed elastomer is higher than or equal to 0.15 $g/cm^3$ and lower than 0.20 $g/cm^3$, the foamed elastomer has properties including a shore hardness ranging from 37 C to 40 C, a rebound resilience ranging from 68% to 76%, a compression set ranging from 25% to 32%, and a tear strength ranging from 8 kg/cm to 12 kg/cm. When the density of the foamed elastomer is higher than or equal to 0.20 $g/cm^3$ and lower than 0.25 $g/cm^3$, the foamed elastomer has properties including a shore hardness ranging from 38 C to 40 C, a rebound resilience ranging from 68% to 71%, a compression set ranging from 29% to 34%, and a tear strength ranging from 9 kg/cm to 13 kg/cm.

DETAILED DESCRIPTION OF THE PREFERRED EMBODIMENT

The properties of density, hardness, rebound resilience, compression set, and tear strength of the foamed elastomer produced by the polyolefin elastomer composite are measured by the methods below.

1. Density:

According to the standard D792 established by American Society for Testing and Materials (ASTM), the foamed elastomer is cut into a specimen sized 3 cm×2.5 cm×1 cm and placed in an environment at 23±2° C. under a humidity of 50±10% for at least 40 hours. Then, the specimen is weighted three times by an electronic balance (Brand:

Percisa; Model: 125A SCS) at 23±2° C. The density is calculated based on the average of the three values measured by the electronic balance.

2. Hardness:

According to the standard D2240 established by ASTM, the foamed elastomer is cut into a round or square specimen with a thickness of 6 mm at least. The lateral dimensions of the specimen shall be sufficient to permit measurements at least 12 mm from any edge. The specimen is measured by a hardness tester set with a load at 23±2° C. for five times. The force applied by the load is 5 kg and the readout time for the hardness value is 5 seconds. The average of the five measured hardness values acts as the hardness of the specimen.

3. Rebound Resilience:

According to the standard D2632 established by ASTM, each foamed elastomer is cut into three specimens with a thickness of 12.5±5 mm. The lateral dimensions of the specimen shall be sufficient to permit measurements at least 14 mm from any edge. Each specimen is measured under a vertical rebound resilience tester (Brand: Gotech Testing Machines Inc.; Model: GT-7042-V1). The 28 g plunger of the vertical rebound resilience tester is released from a height of 40 cm over the specimens. The first rebound height of each specimen after hitting by the plunger is recorded. Each specimen is measured for six times to obtain six rebound height values. The fourth to the sixth rebound height values are averaged to represent the rebound height of each specimen.

4. Compression Set

According to the standard D395 established by ASTM, each foamed elastomer is cut into at least two round specimens with a diameter of 29.0±0.5 mm. A compression set tester (Brand: Gotech Testing Machines Inc.; Model: GT-7049) is preheated at 50° C. for at least 2 hours. The specimens are placed in an environment at 23±2° C. under a humidity of 50±10% for at least 3 hours. Following that, the specimens are compressed to half of their thickness at 50° C. for 6 hours. Take the device from the oven and remove the specimen immediately and allow them to cool on the wood. Measure the thickness of test specimens at 30 minutes. Each specimen is measured for at least two times. The measured values are acted as the final thickness of the specimen. The compression set is calculated by the formula below:

$$C_B = [(t_o - t_i)/(t_o - t_n)] \times 100\%;$$

$C_B$=compression set (method B);
$t_o$=original thickness of the specimen;
$t_i$=final thickness of the specimen;
$t_n$=thickness of the space bars used.

5. Tear Strength

According to the standard D624 established by ASTM, each foamed elastomer is cut into a specimen with a thickness of 1 cm by cutting Die C. The specimen is measured in a tensile strength testing machine (Brand: Gotech Testing Machines Inc.; Model: AI-7000S) with a rate of 500±50 mm/minute. The specimen is measured for three times, and the average of the three measured values represents the tear strength of the foamed elastomer.

Examples 1 to 10: Preparation of the Polyolefin Elastomer Composite

In Examples 1 to 10, a copolymer (A), an unsaturated aliphatic polyolefin (B), an organic peroxide (C), an acrylic acid metallic salt mixture (D), a foaming agent (E), and an additive are prepared for the preparation of the polyolefin elastomer composite. The additive includes stearic acid, zinc stearate, or zinc oxide.

Specifically, the copolymer (A) is selected from the group consisting of: ethylene/vinyl acetate copolymer (A1)(USI Corporation; EVATHENE UE-634), ethylene/octene copolymer (A2)(DOW; Engage 8200), ethylene/octene copolymer (A3)(DOW; Engage 8150), polyolefin block copolymer (A4)(DOW; Infuse 9530), and any combination thereof.

The unsaturated aliphatic polyolefin (B) is selected from the group consisting of: ethylene propylene diene monomer rubber (B1)(DOW; Nordel IP 4570), ethylene propylene diene monomer rubber (B2)(Sabic; EPDM756), polybutadiene rubber (B3)(Lanxess; Buna CB23), and any combination thereof.

The organic peroxide (C) is selected from the group consisting of: dicumyl peroxide (C1)(ACE Chemical Corp.; ACEOX DCP), bis(tert-butylperoxyisopropyl)benzene (C2) (ACE Chemical Corp.; ACEOX BIBP), and a combination thereof.

The acrylic acid metallic salt mixture (D) is selected from the group consisting of: zinc diacrylate mixture (D1)(Sunko Inc Co., Ltd; K-CURE 339)(92 wt % zinc diacrylate/8 wt % zinc stearate), zinc diacrylate mixture (D2)(Sunko Inc Co., Ltd; K-CURE 339F)(91.5 wt % zinc diacrylate/7.5 wt % zinc stearate/1 wt % PTFE-modified polyethylene wax), and a combination thereof.

The foaming agent (E) is azodicarbonamide (ACE Chemical Corp.; ACEOX AC3000).

In the process of preparing the polyolefin elastomer composite, the copolymer (A), the unsaturated aliphatic polyolefin (B), the acrylic acid metallic salt mixture (D), and the additives are mixed at 80° C. to 125° C. in a kneader (Brand: KNEADER; Model: KD-3-20) at a rotational speed of 40 rpm for 5 minutes. Following that, the organic peroxide (C) and the foaming agent (E) are added and mixed with foresaid components for another 5 minutes and form a polyolefin elastomer composite.

The compositions of the copolymer (A), the unsaturated aliphatic polyolefin (B), the organic peroxide (C), and the acrylic acid metallic salt mixture (D) in the polyolefin elastomer composite of Examples 1 to 10 are listed in Table 1. In Examples 1 to 10, the amount of the foaming agent (E), the amount of the stearic acid, the amount of the zinc stearate, and the amount of the zinc oxide are fixed to compare the influence of the compositions of the copolymer (A), the unsaturated aliphatic polyolefin (B), the organic peroxide (C), and the acrylic acid metallic salt mixture (D) in the polyolefin elastomer composite. The amount of the foaming agent (E) is fixed to 3.35 phr; the amount of the stearic acid is fixed to 0.44 phr; the amount of the zinc stearate is fixed to 0.67 phr; the amount of the zinc oxide is fixed to 1.11 phr.

Comparative Examples 1 to 4: Preparation of the Polyolefin Elastomer Composite

The polyolefin elastomer composite of Comparative Examples 1 to 4 are prepared by similar method as the polyolefin elastomer composite of Examples 1 to 10. The difference is that the polyolefin elastomer composite of Comparative Examples 1 to 4 only includes the copolymer (A), the organic peroxide (C), the acrylic acid metallic salt mixture (D), foaming agent (E), and additive. That is, the polyolefin elastomer composite of Comparative Examples 1 to 4 excludes the unsaturated aliphatic polyolefin (B).

The composition of the copolymer (A), the organic peroxide (C), and the acrylic acid metallic salt mixture (D) in the polyolefin elastomer composite of Comparative Examples 1 to 4 are listed in Table 1. The amount of the additive (E), the amount of the stearic acid, the amount of the zinc stearate, and the amount of the zinc oxide in Comparative Examples 1 to 4 are the same with those in Examples 1 to 10.

TABLE 1 composition of the polyolefin elastomer composite in Examples 1 to 10 (E1 to E10) and Comparative Examples 1 to 4 (C1 to C4).

| | composition of the polyolefin elastomer composite (parts by weight) | | | | | | | | | | |
|---|---|---|---|---|---|---|---|---|---|---|---|
| | copolymer (A) | | | | unsaturated aliphatic polyolefin (B) | | | organic peroxide (C) | | metallic acrylate (D) | |
| | (A1) | (A2) | (A3) | (A4) | (B1) | (B2) | (B3) | (C1) | (C2) | (D1) | (D2) |
| E1 | 50 | 0 | 0 | 0 | 50 | 0 | 0 | 0.50 | 0 | 2.2 | 0 |
| E2 | 50 | 0 | 0 | 0 | 50 | 0 | 0 | 0.25 | 0 | 2.2 | 0 |
| E3 | 50 | 0 | 0 | 0 | 50 | 0 | 0 | 0.25 | 0 | 0 | 2.2 |
| E4 | 25 | 25 | 0 | 0 | 50 | 0 | 0 | 0.25 | 0 | 2.2 | 0 |
| E5 | 25 | 0 | 25 | 0 | 50 | 0 | 0 | 0.25 | 0 | 2.2 | 0 |
| E6 | 25 | 25 | 0 | 0 | 0 | 50 | 0 | 0.25 | 0 | 2.2 | 0 |
| E7 | 25 | 25 | 0 | 0 | 0 | 0 | 50 | 0.25 | 0 | 2.2 | 0 |
| E8 | 25 | 0 | 0 | 25 | 50 | 0 | 0 | 0 | 0.22 | 2.5 | 0 |
| E9 | 0 | 0 | 0 | 50 | 50 | 0 | 0 | 0 | 0.22 | 2.5 | 0 |
| E10 | 0 | 0 | 0 | 50 | 50 | 0 | 0 | 0 | 0.22 | 0 | 2.5 |
| C1 | 100 | 0 | 0 | 0 | 0 | 0 | 0 | 0.25 | 0 | 0 | 0 |
| C2 | 100 | 0 | 0 | 0 | 0 | 0 | 0 | 0.25 | 0 | 2.2 | 0 |
| C3 | 100 | 0 | 0 | 0 | 0 | 0 | 0 | 0.50 | 0 | 2.2 | 0 |
| C4 | 100 | 0 | 0 | 0 | 0 | 0 | 0 | 0 | 0.22 | 2.5 | 0 |

Examples 11 to 20 and Comparative Examples 5 to 8: Preparation of Foamed Elastomer To prepare the foamed elastomer, the polyolefin elastomer composite of Examples 1 to 10 and Comparative Examples 1 to 4 are cut into 3 mm-length pellets by a granulator (Brand: Kneader Machinery Co., Ltd.; Model: KD-FR-50) or rolled into sheets by a two-roll mill mixer (Brand: HSU FENG IRON FACTORY COMPANY LIMITED; Model: HF-2RM).

After that, the pellets or the sheets are put into a metal mold and are kept at 160° C. to 170° C. and under 150 kg/cm$^2$ to 170 kg/cm$^2$ for 10 minutes to 20 minutes to prepare the foamed elastomer of Examples 11 to 20 and Comparative Examples 5 to 8. Further, the density, hardness, rebound resilience, compression set, and tear strength of the foamed elastomer are measured by the method stated above and listed in Table 2.

TABLE 2 the properties of the foamed elastomer of Examples 11 to 20 (E11 to E20) and Comparative Examples 5 to 8 (C5 to C8).

| | properties of the foamed elastomer | | | | |
|---|---|---|---|---|---|
| | density (g/cm$^3$) | hardness (shore C) | rebound resilience (%) | compression set (%) | tear strength (kg/cm) |
| E11 | 0.23 | 38 | 71 | 29 | 13 |
| E12 | 0.17 | 37 | 71 | 32 | 12 |
| E13 | 0.16 | 39 | 70 | 30 | 11 |
| E14 | 0.17 | 37 | 74 | 25 | 9 |
| E15 | 0.19 | 38 | 76 | 29 | 10 |
| E16 | 0.17 | 39 | 75 | 27 | 9 |
| E17 | 0.20 | 40 | 68 | 34 | 9 |
| E18 | 0.19 | 40 | 68 | 32 | 8 |
| E19 | 0.16 | 38 | 70 | 31 | 8 |
| E20 | 0.17 | 39 | 71 | 29 | 9 |
| C5 | 0.13 | 28 | 50 | 82 | 4 |
| C6 | 0.16 | 30 | 54 | 70 | 5 |
| C7 | 0.20 | 35 | 57 | 65 | 6 |
| C8 | 0.17 | 33 | 55 | 68 | 5 |

According to the results of Table 1 and Table 2, by adding the unsaturated aliphatic polyolefin and controlling the proportions of the polyolefin elastomer composite, the foamed elastomers of Examples 11 to 20 have properties including shore hardness ranging from 37 C to 40 C, rebound resilience ranging from 68% to 76%, compression set ranging from 25% to 34%, and tear strength ranging from 8 kg/cm to 13 kg/cm. Compared to Comparative Examples 5 to 8, the foamed elastomer of Examples 11 to 20 have better rebound resilience, lower compression set, and higher tear strength, and thus can be widely applied in many fields.

Besides, with the better compression set and rebound resilience as well as proper density and the hardness, the second compression molding process can be omitted in the process of preparing the foamed elastomer of the present invention. Therefore, the process time and procedure for preparing the foamed elastomer can be shortened, thereby lowering the production cost.

Based on the results of Examples 11 and 17, when the density of the foamed elastomer is higher than or equal to 0.20 g/cm$^3$ and lower than or equal to 0.25 g/cm$^3$, the foamed elastomer has a shore hardness ranging from 38 C to 40 C, a rebound resilience ranging from 68% to 71%, a compression set ranging from 29% to 34%, and a tear strength ranging from 9 kg/cm to 13 kg/cm.

Based on the results of Examples 12 to 16 and 18 to 20, when the density of the foamed elastomer is higher than or equal to 0.15 g/cm$^3$ and lower than 0.20 g/cm$^3$, the foamed elastomer has a shore hardness ranging from 37 C to 40 C, a rebound resilience ranging from 68% to 76%, a compression set ranging from 25% to 32%, and a tear strength ranging from 8 kg/cm to 12 kg/cm.

Accordingly, users can regulate the density and hardness of the foamed elastomer as needed which have the properties of the rebound resilience over 68%, the compression set lower than 34%, and the tear strength over 8 kg/cm.

Further, based on the results of Examples 1, 2, 11, and 12, when the polyolefin elastomer composite includes more organic peroxide (C), the foamed elastomer can have lower compression set.

Based on the results of Examples 2, 3, 12, and 13 or the results of Examples 9, 10, 19, and 20, both acrylic acid metallic salt mixtures can reduce the compression set of the foamed elastomer. Take Examples 2 and 3 for example: the acrylic acid metallic salt mixtures added in the polyolefin elastomer composite are both zinc diacrylate compound, but the acrylic acid metallic salt mixtures in Example 3 further includes a PTFE-modified polyethylene wax as a dispersant for improving the dispersibility and the reactivity of the acrylic acid metallic salt mixtures. As shown in Table 2, the compression set of the foamed elastomer in Example 13 is reduced accordingly. Likewise, Examples 9 and 10 also show the similar results. The acrylic acid metallic salt mixtures of Examples 9 and 10 are both zinc diacrylate compound, and the difference between Examples 9 and 10 is that the acrylic acid metallic salt mixtures in Example 10 further includes a PTFE-modified polyethylene wax as a dispersant for improving the dispersibility and the reactivity of the acrylic acid metallic salt mixtures. From Table 2, the rebound resilience is improved and the compression set is reduced accordingly.

Further, by using at least two kinds of copolymers (A), the rebound resilience of the foamed elastomer can be enhanced and the compression set of the foamed elastomer can be improved. For example, the polyolefin elastomer of Example 4 includes two kinds of ethylene copolymers (ethylene/vinyl acetate copolymer (A1) and ethylene/octene copolymer (A2)). Based on the results of Examples 2, 4, 12, and 14, the foamed elastomer of Example 14 has improved rebound resilience and compression set. Similarly, the polyolefin elastomer of Example 5 includes two kinds of ethylene copolymers (ethylene/vinyl acetate copolymer (A1) and ethylene/octene copolymer (A3)). Based on the results of Examples 2, 5, 12, and 15, the foamed elastomer of Example 15 also has improved rebound resilience and compression set.

Based on the results of Examples 4, 5, 8, 14, 15, and 18, by adopting two kinds of ethylene copolymers or using one kind of ethylene copolymer with one kind of polyolefin block copolymer, the foamed elastomer will have improved rebound resilience and compression set. Besides, the density and the shore hardness (37 C to 40 C) of the foamed elastomer can be slightly adjusted according to different compositions of the copolymer (A).

In conclusion, the polyolefin elastomer composite of the present invention can be used to prepare the foamed elastomer having proper structural strength, high rebound resilience, and low compression set. Accordingly, the second compression molding process can be omitted in the process of preparing the foamed elastomer by the polyolefin elastomer composite of the present invention.

What is claimed is:

1. A polyolefin elastomer composite comprising:
   a copolymer comprising at least two kinds of ethylene copolymers;
   an unsaturated aliphatic polyolefin comprising ethylene propylene diene monomer rubber and having a weight ratio relative to the copolymer ranging from 1:3 to 3:1;
   an organic peroxide in an amount from 0.1 phr to 1 phr based on a total amount of the unsaturated aliphatic polyolefin and the copolymer as 100 phr;
   an acrylic acid metallic salt mixture in an amount ranging from 0.1 phr to 5 phr based on the total amount of the unsaturated aliphatic polyolefin and the copolymer as 100 phr; and
   a foaming agent.

2. The polyolefin elastomer composite as claimed in claim 1, wherein the at least two kinds of ethylene copolymers are respectively selected from the group consisting of an ethylene/vinyl acetate copolymer, an ethylene/octene copolymer, an ethylene/alpha-olefin copolymer, an ethylene/alpha-olefin non-conjugated diene copolymer, an ethylene/acrylic copolymer, an ethylene/methyl acrylic copolymer, an ethylene/methyl acrylate copolymer, an ethylene/methyl methacrylate copolymer, an ethylene/ethyl acrylate copolymer, an ethylene/ethyl methacrylate copolymer, an ethylene/butyl acrylate copolymer, an ethylene/butyl methacrylate copolymer, and any combination thereof.

3. The polyolefin elastomer composite as claimed in claim 2, wherein the at least two kinds of ethylene copolymers are an ethylene/vinyl acetate copolymer and an ethylene/octene copolymer.

4. The polyolefin elastomer composite as claimed in claim 1, wherein the organic peroxide is selected from the group consisting of: a dicumyl peroxide, a bis(tert-butylperoxyisopropyl)benzene, a tert-butyl peroxybenzoate, a di(methylbenzoyl)peroxide, and any combination thereof.

5. The polyolefin elastomer composite as claimed in claim 1, wherein the acrylic acid metallic salt mixture comprises a zinc diacrylate, a zinc dimethacrylate, a zinc diethylacrylate, a zinc dipropylacrylate, a zinc dibutylacrylate, a zinc dipentylacrylate, a zinc dihexylacrylate, or any combination thereof.

6. The polyolefin elastomer composite as claimed in claim 1, wherein the acrylic acid metallic salt mixture includes a dispersant, wherein the dispersant is in an amount from 0.1 wt % to 5 wt % based on a total amount of the acrylic acid metallic salt mixture.

7. The polyolefin elastomer composite as claimed in claim 6, wherein the dispersant is a polytetrafluoroethylene wax or a polytetrafluoroethylene-modified polyethylene wax.

8. A foamed elastomer produced from the polyolefin elastomer composite as claimed in claim 1, wherein the foamed elastomer has a density ranging from 0.1 g/cm$^3$ to 0.25 g/cm$^3$.

9. The foamed elastomer as claimed in claim 8, wherein the foamed elastomer has a rebound resilience ranging from 60% to 80%.

10. The foamed elastomer as claimed in claim 8, wherein the foamed elastomer has a compression set ranging from 20% to 40%.

* * * * *